United States Patent Office 3,736,350
Patented May 29, 1973

3,736,350
AROMATIC DIAMINES CONTAINING ESTER GROUPS
Walter Meckel, Dusseldorf, and Erwin Muller, Leverkusen, Germany, assignors to Bayer Aktiengesellschaft, Leverkusen, Germany
No Drawing. Filed Oct. 14, 1969, Ser. No. 866,373
Claims priority, application Germany, Oct. 17, 1968,
P 18 03 635.6
Int. Cl. C07c 101/54
U.S. Cl. 260—471 R     3 Claims

ABSTRACT OF THE DISCLOSURE

Novel aromatic diamines containing ester groups wherein the amino groups are in the m and/or p-position relative to the ester group, and with a substituent in the o-position to at least one amino group are useful to prepare polyurethane elastomers therefrom with an organic diisocyanate and an organic compound containing at least two hydroxyl groups and having a molecular weight of from about 800 to about 5000.

---

This invention relates to novel aromatic diamines and to elastomeric polyurethanes prepared therefrom. More particularly, this invention relates to aromatic diamines containing ester groups and to elastomeric polyurethanes prepared therefrom and having good tensile strength and elasticity.

This invention relates to aromatic diamines containing ester groups in which the amino groups are in the m and/or p-position relative to the ester group, and with a substituent in the o-position to at least one amino group. Preferred substituents include halogen atoms, such as, fluorine, chlorine, bromine or iodine, among which chlorine is particularly preferred, and alkoxy radicals containing from 1 to 4 carbon atoms.

Diamines of this invention include those having the formula

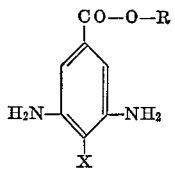

wherein R represents an alkyl radical having from 1 to 20 carbon atoms which optionally can contain oxygen atoms, an aryl-, aralkyl- or cycloalkyl radical and X represents an alkoxy radical having from 1 to 4 carbon atoms or a halogen atom; those having the formula

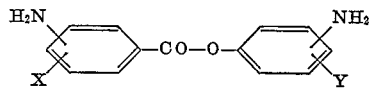

wherein X represents a hydrogen or halogen atom and Y represents a halogen atom;
those having the formula

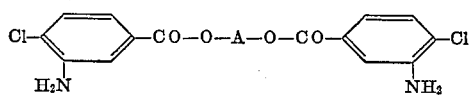

wherein A represents an alkylene radical having from 2 to 6 carbon atoms which may be optionally branched and/or contain oxygen, sulfur or —N(R)— (R=$C_1$-$C_4$-alkyl) atoms; those having the formula

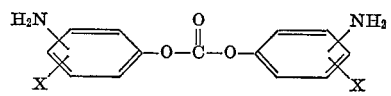

wherein each X represents halogen and in which at least one substituent X is in the o-position to the amino group; and those having the formula

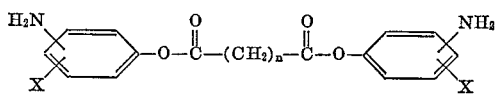

wherein $n$ represents a number of from 0 to 4 and X represents halogen and in which at least one substituent X is in the o-position to the amino group.

More specific examples of such compounds are those having the formula

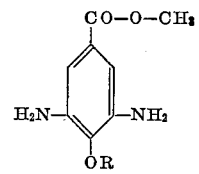

wherein R represents —$CH_3$, —$C_2H_5$, —$C_3H_7$ or
—iso—$C_3H_7$ those having the formula

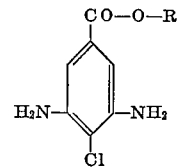

wherein R represents —$CH_3$, —$C_2H_5$, n-, iso—$C_3H_7$, n-, iso—$C_4H_9$;

$C_5H_{11}$, iso—$C_5H_{11}$, —$C_6H_{13}$, $$-C\overset{CH_3}{\underset{CH_2-CH(CH_3)_2}{H}}$$

—$CH_2$—CH—$(C_2H_5)_2$—, —$C_7H_{15}$, —$C_8H_{17}H$, $$-CH_2-\overset{C_2H_5}{\underset{C_4H_9}{CH}}, \quad -CH_2-\overset{CH_3}{\underset{CH_3}{\overset{|}{C}}}-C_2H_5, \quad -CH_2-CH_2-\overset{CH_3}{\underset{CH_3}{\overset{|}{C}}}-C_4H_9,$$

—$C_{10}H_{21}$, —$C_{12}H_{25}$, —$C_{14}H_{29}$, —$C_{16}H_{33}$, —$C_{18}H_{37}$,
—$C_6H_5$, —$C_6H_{11}$, $$-\!\!\left\langle\;H\;\right\rangle\!\!-C(CH_3)_3,$$

—$CH_2CH_2$—O—$C_4H_9$, —$CH_2$—$CH_2$—O—$CH(CH_3)_2$ or
—$CH_2$—$CH_2$—O—$CH_2$—$CH_2$—O—$C_4H_9$ the compound having the formula

the compound having the formula

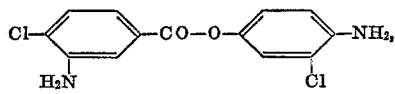

the compounds having the formula

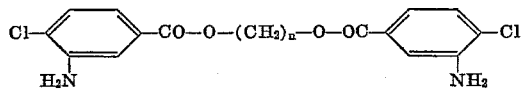

wherein n represents a number of from 2 to 6,
the compound having the formula

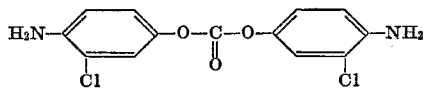

and the compounds having the formula

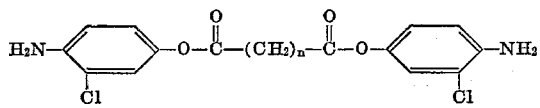

wherein n represents a number of from 0 to 4.

The new aromatic diamines containing ester groups may be prepared by generally known processes. For example, diamines having the general formula

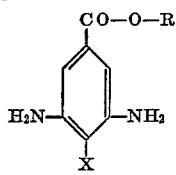

wherein X and R are as defined above, can be obtained by reacting corresponding dinitrobenzoic acids of the formula

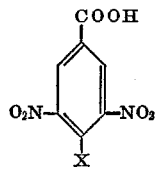

or their acid halides with alcohols of the formula R—OH and subsequently hydrogenating the nitro groups by generally known methods, such as, for example, by catalytic hydrogenation.

Compounds having the formula

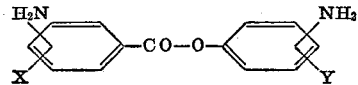

wherein X and Y are as defined above, can be obtained, for example, by reacting nitrobenzoic acids of the formula

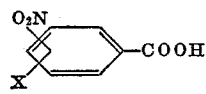

or their acid halides with nitrophenols corresponding to the formula

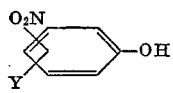

and subsequently hydrogenating the nitro groups into amino groups by generally known methods.

Diamines having the formula

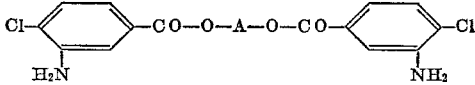

wherein A is as defined above, can be obtained, for example, by reacting 3-nitro-4-chlorobenzoic acid with alcohols of the formula HO—A—OH, such as, for example, with ethylene glycol, diethylene glycol, 1,4-butane diol, dipropylene glycol, bis-β-hydroxy ethylsulphide or N-methyl diethanolamine, accompanied by esterification. However, 4-chloro-3-nitrobenzoic acid chloride, may alternatively be reacted with the aforementioned diols by the Schotten-Baumann method. The reaction is again followed by catalytic hydrogenation of the nitro groups into amino groups.

Compounds having the formula

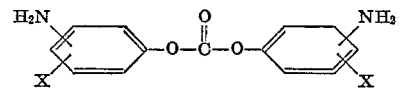

wherein X is as defined above, can be obtained, for example, by reacting phenols corresponding to the formula

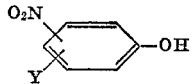

for example, with diphenyl carbonate of phosgene, by generally known methods, and subsequently hydrogenating the resulting dinitrodiphenyl carbonates.

Compounds having the formula

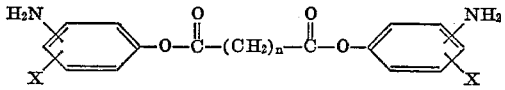

wherein X and n are as defined above, may also be obtained in a generally known manner by reacting nitrophenols corresponding to the formula

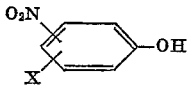

by the Schotten-Baumann method with dicarboxylic acid halides, such as, for example, with oxalyl chloride, succinic acid dichloride and glutaric acid dichloride, in the presence of aqueous sodium hydroxide, or by thermally esterifying the aforementioned dicarboxylic acids with the corresponding nitrophenols. The nitro groups are subsequently hydrogenated into amino groups by generally known methods, such as, for example, in solvents such as methanol or dioxane, optionally in the presence of catalysts, such as, for example, Raney nickel or platinum.

The following are examples of the novel compounds according to the invention:

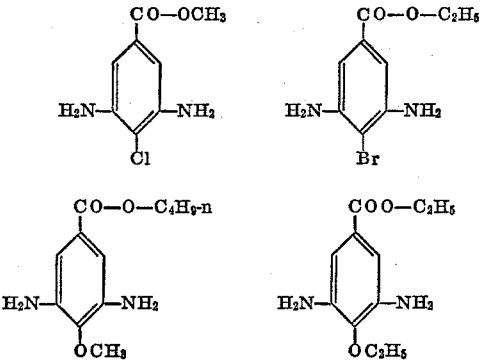

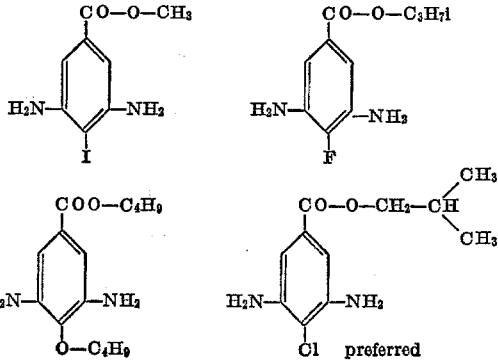

preferred

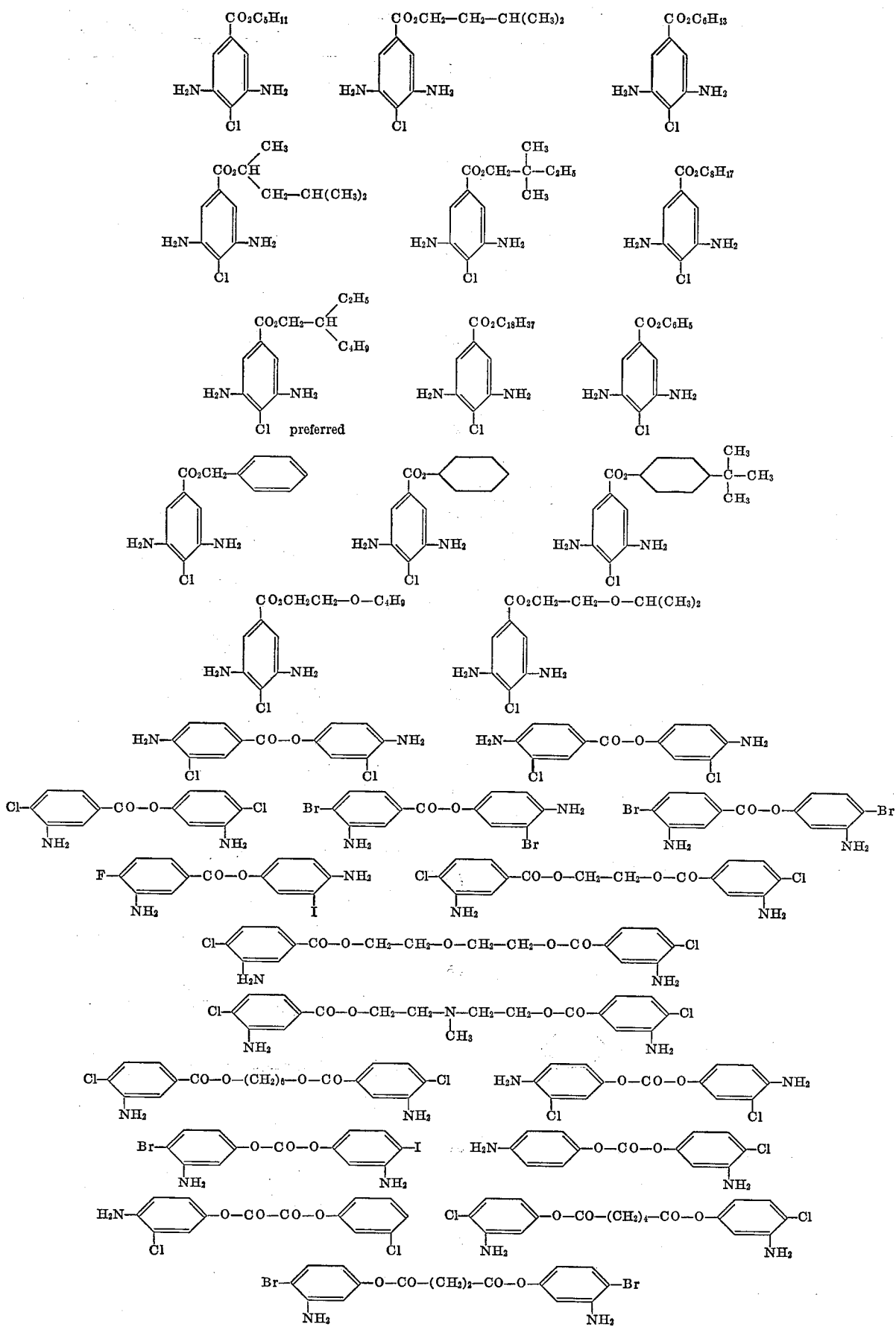

Generally, the novel diamine compounds may be used, for example, as starting materials in the production of dyes and plant protection agents.

The compounds have proved to be particularly valuable as chain extending agents in the production of plastics with elastomeric properties by the conventional isocyanate-polyaddition process.

Accordingly, this invention also relates to a process for the production of polyurethane elastomers from an organic compound containing at least two hydroxyl groups reactive with isocyanate groups and having a molecular weight of from about 800 to about 5,000, an organic diisocyanate and an aromatic diamine as chain-extender, wherein the aromatic diamine contains an ester group, the amino groups are in the m- and/or p-position to the ester group, and with a substituent in the o-position to at least one amino group.

Preferred chain-extending agents are diamines of the kind in which the amino groups are in the m-or p-position to the ester group and having a halogen substituent, preferably chlorine, or an alkoxy substituent having from 1 to 4 carbon atoms in the o-position to at least one amino group.

Further preferred diamines to be used as chain extenders are those derivated from 4-chloro-3,5-diamino benzoic acid by esterification with linear or branched higher alcohols, which may contain hetero atoms, with phenols, araliphatic alcohols or cycloaliphatic alcohols. Considerable advantage of the diamines according to the invention resides in the fact that, by suitable choice of the alcohols, the melting point of the diamines can be modified so that liquid products result from the handling of which offers advantages, since melting is not required. Diamines representing particularly preferred chain-extending agents for the purpose of this invention include those having the formula

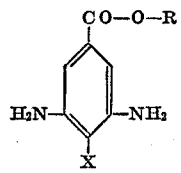

wherein R represents an alkyl radical having from 1 to 20 carbon atoms which optionally can contain oxygen atoms, an aryl-, aralkyl- or cycloalkyl radical and X represents an alkoxy radical having from 1 to 4 carbon atoms or halogen; those having the formula

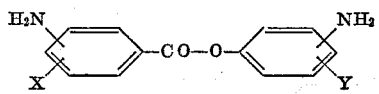

wherein X represents a hydrogen or halogen atom and Y represents a halogen atom;
those having the formula

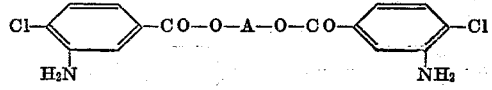

wherein A represents an alkylene radical having from 2 to 6 carbon atoms which may be optionally branched and/or contain oxygen, sulfur or —N(R)—

(R=C$_1$-C$_4$-alkyl)

atoms; those having the formula

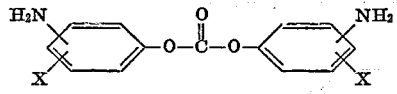

wherein each X represents halogen and in which at least one substituent X is in the o-position to the amino group;

those having the formula

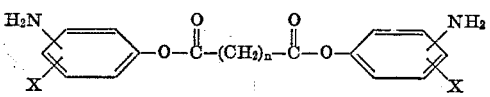

wherein $n$ represents a number of from 0 to 4 and each X represents halogen and in which at least one substituent X is in the o-position to the amino group; those having the formula

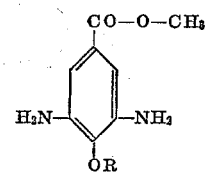

wherein R represents —CH$_3$, —C$_2$H$_5$, —C$_3$H$_7$ or —iso—C$_3$H$_7$;
those having the formula

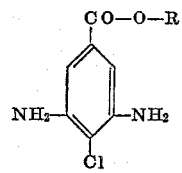

wherein R represents —CH$_3$, —C$_2$H$_5$, n—, iso—C$_3$H$_7$, n—, iso-C$_4$H$_9$; C$_5$H$_{11}$, iso-C$_5$H$_{11}$, —C$_6$H$_{13}$, $$-CH\begin{matrix}CH_3\\ CH_2-CH(CH_3)_2\end{matrix},$$

—CH$_2$—CH—(C$_2$H$_5$)$_2$, —C$_7$H$_{15}$, —C$_8$H$_{17}$, $$-CH_2-C\begin{matrix}C_2H_5\\ C_4H_9\end{matrix},$$

$$-CH_2-\underset{\underset{CH_3}{|}}{\overset{\overset{CH_3}{|}}{C}}-C_2H_5, -CH_2-CH_2-\underset{\underset{CH_3}{|}}{\overset{\overset{CH_3}{|}}{C}}-C_4H_9, -C_{10}H_{21},$$

—C$_{10}$H$_{21}$, —C$_{12}$H$_{25}$, —C$_{14}$H$_{29}$, —C$_{16}$H$_{33}$, —C$_{18}$H$_{37}$, —C$_6$H$_5$, —C$_6$H$_{11}$,

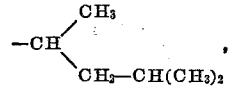

—CH$_2$CH$_2$—O—C$_4$H$_9$, —CH$_2$—CH$_2$—O—CH(CH$_3$)$_2$ or —CH$_2$—CH$_2$—O—CH$_2$—CH$_2$—O—C$_4$H$_9$ those having the formulae

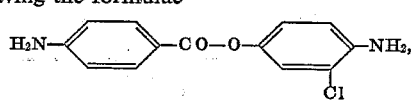

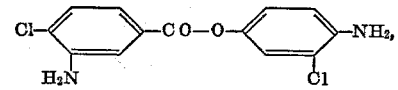

wherein $n$ represents a number of from 2 to 6;
and those having the formulae

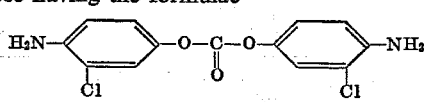

and

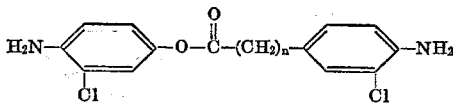

wherein $n$ represents a number of from 0 to 4.

Suitable starting materials for the production of elastomeric polyurethanes according to this invention include those organic compounds with at least two hydroxyl groups reactive with isocyanate groups and having molecular weights of from about 800 to about 5,000, preferably with molecular weights of from about 1,000 to about 3,000.

Any suitable hydroxyl polyester may be used such as linear or slightly branched polyesters obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, brassylic acid, sebacic acid, thapsic acid, maleic acid, fumaric acid, glutaconic acid, diethylsuccinic acid, isophthalic acid, terephthalic acid, 1,4-cyclohexanedicarboxylic acid, and the like as well as hydroxy carboxylic acids. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol and the like. The polyesters may contain double- or triple bonds in unsaturated fatty acid moieties.

Any suitable linear or slightly branched polyhydric polyalkylene ether may be used such as, for example, the condensation product of an alkylene oxide beginning with any suitable initiator. The initiator may be difunctional compounds including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including, for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Copolymers of this type may also be used. Any suitable initiator may be used including, for example, water, polyhydric alcohols, preferably having 2 to 8 hydroxyl groups, aminoalcohols, amines preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Pats. 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, 1,2-propylene glycol, hexane-1,6-diol, ammonia, ethanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,-N',N'-tetrakis-(2-hydroxypropyl) ethylene diamine, diethylene triamine and the like. A proportion of a trifunctional starting component, such as trimethylol propane or glycerol, may also be optionally used. It is of course also possible to use mixtures of linear and/or slightly branched polyalkylene glycol ethers of different types.

Any suitable polyhydric polythioether may be used such as, for example, the condensation product of thiodiglycol or the reaction product of a polyhydric alcohol such as is disclosed above for the preparation of the hydroxy polyesters with any other suitable thioetherglycol. Other suitable polyhydric polythioethers are disclosed in U.S. Pats. 2,862,972 and 2,900,368.

The hydroxy polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable organic diisocyanate may be used in the process of the present invention including aromatic, aliphatic and heterocyclic diisocyanates. In other words, two isocyanate radicals may be bonded to any suitable divalent organic radical to produce the organic diisocyanates which are useful in accordance with the present invention including acyclic, alicyclic, aromatic and heterocyclic radicals. Suitable organic polyisocyanates are therefore ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3' - dimethyl - 4,4' - biphenylene diisocyanate, 3,3'-dimethoxy-4,4'-biphenylenediisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, furfurylidene diisocyanate and the like.

Examples of preferred diisocyanates include aliphatic diisocyanates, having the general formula $$OCN-(CH_2)_n-NCO$$

wherein $n$ represents a number from 2 to 8; cycloaliphatic diisocyanates, such as hexahydrotolylene-2,4- and 2,6-diisocyanate and mixtures of these isomers, or dicyclohexyl methane diisocyanate, araliphatic diisocyanates such as 1,3-xylylene diisocyanate, and aromatic diisocyanates such as tolylene-2,4 or 2,6-diisocyanate and mixtures of these isomers such as a mixture of 80% 2,4-toluylene diisocyanate and 20% 2,6-toluylene diisocyanate, phenylene-1,4-diisocyanate, diphenylmethane-4,4'-diisocyanate, diphenyl ether 4,4'-diisocyanate, naphthylene-1,5-diisocyanate and the like. Isophorone diisocyanate and ester diisocyanates of carboxylic acids of the kind described, for example, in British patent specification No. 965,474, may also be used as diisocyanates in accordance with the invention. Proportions of triisocyanates such as, p,p',p''-triphenyl methane triisocyanate may be used.

Generally, the quantities in which the reactants are used are selected in such a way that the molar ratio of diisocyanate to chain extender plus the compound containing reactive hydroxyl groups, which is governed by the particular processing method used, is generally from 1.0 to 1.5 and preferably from 1.05 to 1.25.

The molar ratio of NH$_2$-groups in the chain-extender to reactive OH groups may vary within wide limits, although it is preferably from 0.4 to 1.5, producing soft to hard types of polyurethanes.

The process according to this invention may be carried out in many suitable and different ways. For example, the compound containing at least two hydroxyl groups may be reacted with an excess of diisocyanate and, after the diamine chain-extender of the invention has been added, the resulting melt is poured into molds. After heating for several hours, a high grade elastic polyurethane plastic is obtained.

In another embodiment, the fairly high molecular weight compound containing at least two hydroxyl groups, in admixture with the diamine chain-extender of the invention, is reacted with an excess of diisocyanate, and the reaction product is molded under heat and pressure after it has been granulated. Depending upon the quantities in which the reactants are used, it is possible in this way to obtain polyurethane plastics with different degrees of hardness and elasticity. In this way, it is possible to obtain plastics which can be processed like thermoplasts. In yet another embodiment, the relatively high molecular weight compound containing at least two hydroxyl groups, in admixture with the diamine chain-extender of the invention, is reacted with a less than equivalent amount of diisocyanate, resulting in the formation of a millable sheet which may be converted in a subsequent stage, for example, by crosslinking with more diisocyanate, into an elastomeric polyurethane plastic.

The elastomeric polyurethanes obtained according to the invention are particularly valuable when the commercially available isomer mixture of 80% by weight of 2,4- and 20% by weight of 2,6-tolylene diisocyanate is used as the diisocyanate.

Although it was known that aromatic diamines containing a chlorine atom, for example, in the o-position to the amino group, may be used as chain-extenders in the production of polyurethane elastomers, it was extremely surprising that the compounds according to the invention should be excellent chain-extenders for the production of elastic polyurethanes. Since aminoesters normally undergo aminolysis at elevated temperature, the diamine compounds of the invention, which are best handled at temperatures above their melting point, had not been expected to be suitable for use as chain-extenders in the production of polyurethanes. Nevertheless, it has been found that, in comparison with elastomeric polyurethane obtained, for example, with 3,3'-dichloro-4,4-diaminodiphenyl methane as chain extender, polyurethane elastomers prepared with the compounds according to the invention are distinguished by their greater tensile strength and higher elasticity.

The products according to the invention may be used for a variety of purposes including, for example, the production of moldings of the kind used in machine or vehicle construction, for example, in the manufacture of gear rings, V-belts, gear wheels, bearing shells, seals, diaphragms and the like. The polyurethanes may be modified with the usual additives, for example, dyes, pigments or fillers if desired.

The invention is further illustrated but is not intended to be limited by the following examples in which all parts and percentages are by weight unless otherwise specified.

EXAMPLE 1

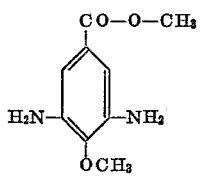

About 1 mol of potassium hydroxide is dissolved in about 800 ml. of methanol. About 1 mol of 4-chloro-3,5-dinitrobenzoic acid methyl ester is added in portions with cooling. The reaction mixture is then heated under reflux until the reaction is at an end, as shown by a change in the originally violet color to yellow. 4-methoxy-3,5-dinitrobenzoic acid methyl ester crystallizes out on cooling. Yield: 205 g. M.P. 53° C.–55° C.

About 100 parts of this compound are hydrogenated with 20 parts of Raney nickel "B" in about 400 ml. of dioxan. About 70 parts of 4-methoxy-3,5-diaminobenzoic acid methyl ester melting at 157° C.–158° C. are obtained following recrystallization from methanol.

Calculated (percent): C, 55.1; H, 6.2; N, 14.3. Found (percent): C, 55.2; H, 5.4; N, 14.2.

EXAMPLE 2

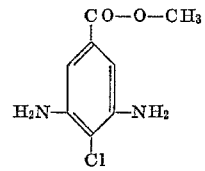

About 200 parts of 4-chloro-3,5-dinitrobenzoic acid methyl ester, which can be obtained by nitrating chlorobenzoic acid at about 120° C.–140° C. and esterifying the resulting 4-chloro-3,5-dinitrobenzoic acid with methanol, are hydrogenated at room temperature with 40 parts of Raney nickel and 30 parts of sodium bicarbonate in about 500 ml. of dioxan. About 140 parts of 4-chloro-3,5-diaminobenzoic acid methyl ester melting at 128° C.–129° C. are obtained after recrystallization from methanol/water.

Calculated (percent): C, 47.9; H, 4.5; N, 14.0; Cl, 17.6. Found (percent): C, 47.8; H, 4.7; N, 13.9; Cl, 17.7.

EXAMPLE 3

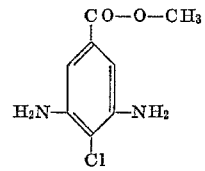

About 1 mol of 4-chloro-3-nitrobenzoyl chloride dissolved in about 200 ml. of acetone are added dropwise in a nitrogen atmosphere at about 20° to 40° C. to a solution of about 1 mol of 3-chloro-4-nitrophenol in 1 liter of normal caustic soda solution. About 310 parts of 4-chloro-3-nitrobenzoic acid-(3' - chloro-4'-nitro)-phenyl ester melting at 157° C.–158° C. are obtained after recrystallization from toluene.

Calculated (percent): C, 43.7; H, 1.7; N, 7.9; Cl, 19.9. Found (percent): C, 43.7; H, 2.0; N, 7.8; Cl, 20.0.

About 200 parts of this compound are hydrogenated at about 20° C. to 40° C. with 40 parts of Raney nickel "B" and about 30 parts of sodium bicarbonate in about 750 ml. of dioxan. Recrystallization from dimethyl formamide/water gives 135 parts of 4-chloro-3-aminobenzoic acid-(3'-chloro-4'-amino)-phenyl ester melting at 145° C.–146° C.

Calculated (percent): C, 52.6; H, 3.3; N, 9.4; Cl, 23.9. Found (percent): C, 52.5; H, 3.7; N, 9.5; Cl, 23.5.

EXAMPLE 4

Following the procedure described in Example 3, about 260 parts of 4-nitrobenzoic acid-(3'-chloro-4'-amino)-phenyl ester melting at 157° C.–158° C. are obtained with about 1 mol of 4-nitrobenzoyl chloride.

Calculated (percent): C, 50.6; H, 2.3; N, 9.1; Cl, 11.5. Found (percent): 50.4; H, 2.5; N, 9.0; Cl, 11.3.

About 120 parts of 4-aminobenzoic acid-(3'-chloro-4'-amino)-phenyl ester are obtained by hydrogenating this compound in accordance with the procedure described in Example 3. M.P. 138° C.–140° C.

Calculated (percent): C, 59.5; H, 4.2; N, 10.7; Cl, 13.5. Found (percent): C, 59.8; H, 4.3; N, 10.8; Cl, 13.4.

EXAMPLE 5

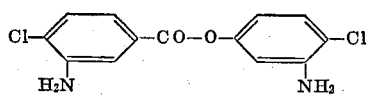

Following the procedure described in Example 3, about 285 parts of 4-chloro-3-nitrobenzoic acid-(4'-chloro-3'-nitro)-phenyl ester melting at 128° C. are obtained with about 1 mol of 4-chloro-3-nitrophenol.

Calculated (percent): C, 43.7; H, 1.7; N, 7.8; Cl, 19.9.
Found (percent): C, 43.5; H, 2.0; N, 7.8; Cl, 20.0.

About 140 parts of 4-chloro-3-aminobenzoic acid-(4'-chloro-3'-amino)-phenyl ester are obtained by hydrogenation in accordance with the procedure described in Example 3. M.P. 147° C.–148° C.

Calculated (percent): C, 52.6; H, 3.3; N, 9.4; Cl, 23.9.
Found (percent): C, 52.8; H, 3.7; N, 9.5; Cl, 23.5.

EXAMPLE 6

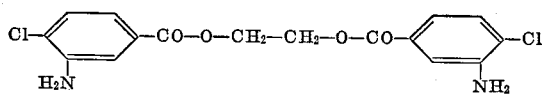

About 2 mols of 4-chloro-3-nitrobenzoic acid are heated under nitrogen for about 8 hours at about 100° C. with about 1 mol of ethylene glycol and about 1 ml. of about 36% hydrochloric acid, and then for about 5 hours at about 160° C. The dinitro compound formed (about 350 parts) melts at 160° after recrystallization from benzene.

Calculated (percent): C, 44.8; H, 2.4; N, 6.7; Cl, 16.6.
Found (percent): C, 45.1; H, 2.6; N, 6.3; Cl, 16.7.

Following hydrogenation in accordance with the procedure described in Example 2, ethylene glycol-bis-(4-chloro-3-amino)-benzoic acid ester is obtained, melting at 171° C. after recrystallization.

Calculated (percent): C, 52.1; H, 3.8; N, 7.6; Cl, 19.2.
Found (percent): C, 52.4; H, 3.9; N, 7.5; Cl, 18.9.

EXAMPLE 7

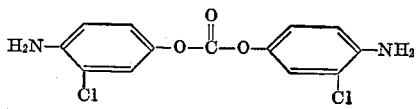

About 2 mols of 3-chloro-4-nitrophenol are dissolved under nitrogen in about 100 ml. of twice normal sodium hydroxide solution. A vigorous stream of phosgene is introduced at about 20° C. to 40° C. The 3,3'-dichloro-4,4'-dinitrodiphenyl carbonate which precipitates is suction filtered and recrystallized from toluene, M.P. 151° C.

Calculated (percent): C, 42.0; H, 1.6; N, 7.5; Cl, 19.1.
Found (percent): C, 42.1; H, 1.7; N, 7.4; Cl, 19.3.

3,3'-dichloro-4,4'-diaminodiphenyl carbonate is obtained by hydrogenation in accordance with the procedure described in Example 3. M.P. 166°–168° C.

Calculated (percent): C, 49.9; H, 3.1; N, 8.9; Cl, 22.6.
Found (percent): C, 50.2; H, 3.4; N, 9.1; Cl, 22.2.

EXAMPLE 8

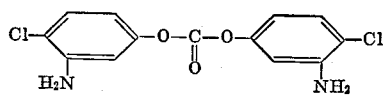

4,4'-dichloro-3,3'-dinitrodiphenyl carbonate melting at 183° C.–185° C. is prepared in accordance with the procedure described in Example 7.

Calculated (percent): C, 42.0; H, 1.6; N, 7.5; Cl, 19.1.
Found (percent): C, 41.9; H, 1.8; N, 7.3; Cl, 19.1.

4,4'-dichloro-3,3'-diamino diphenyl carbonate is obtained by hydrogenation in accordance with Example 3. M.P. 192° C.–193° C.

Calculated (percent): C, 49.9; H, 3.1; N, 8.9; Cl, 22.6.
Found (percent): C, 50.1; H, 3.1; N, 9.2; Cl, 22.8.

EXAMPLE 9

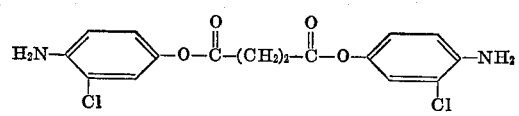

About 2 mols of 3-chloro-4-nitrophenol are dissolved in about 1000 ml. of twice normal sodium hydroxide solution, about 1 mol of succinic acid dichloride being added dropwise to the resulting solution under nitrogen at a temperature of from about 20° C. to 40° C.

The product which precipitates is filtered off under suction. Succinic acid di-(3-chloro-4-nitro)-phenyl ester melting at 96°–97° C. is obtained after drying and recrystallization from benzene/cyclohexane.

Calculated (percent): C, 44.8; H, 2.4; N, 6.5; Cl, 16.6.
Found (percent): C, 45.0; H, 2.6; N, 6.3; Cl, 16.3.

Succinic acid di-(3-chloro-4-amino)-phenyl ester melting at 196° C.–198° C. (from dioxan) is obtained by hydrogenation in accordance with the procedure described in Example 3.

Calculated (percent): C, 52.1; H, 3.8; N, 7.6; Cl, 19.2.
Found (percent): C, 52.1; H, 4.0; N, 7.7; Cl, 18.8.

EXAMPLE 10

About 200 parts of a polyester of adipic acid and ethylene glycol (OH number 56) are dehydrated in vacuo for about 15 minutes at about 130° C. About 40 parts of a mixture of 80% of 2,4- and 20% of 2,6-tolylene diisocyanate are then added. After about 30 minutes, about 29.7 parts of the compound of Example 3 are added in the form of a melt. After an interval of about 20 seconds, the homogeneous melt is poured into preheated molds and heated for about another 24 hours at about 100° C. The polyurethane elastomer formed has the following mechanical properties:

Tensile strength (DIN 53504) _____kg./cm.² __ 321
Breaking elongation (DIN 53504) _____percent__ 625
Permanent elongation (1 minute after tearing) _____do____ 9
Intrinsic strength _____kp__ 48
Shore hardness A (DIN 53505) _____ 88
Elasticity (DIN 53512) _____percent__ 30

COMPARISON EXAMPLE

The procedure is as described in Example 10 except that about 27 parts of 3,3'-dichloro-4,4'-diaminodiphenyl methane is used as the chain-extender. The polyurethane elastomer formed shows the following mechanical properties:

Tensile strength (DIN 53503) _____kg./cm.² __ 234
Breaking elongation (DIN 53504) _____percent__ 440
Permenent elongation (1 minute after tearing) _____percent__ 11
Intrinsic strength _____kp__ 37
Shore hardness A (DIN 53505) _____ 84
Elasticity (DIN 53512) _____percent__ 31

EXAMPLE 11

The procedure is as described in Example 10 except that about 26.2 parts of the diamine according to Example 4 is used as the chain-extender. A polyurethane elastomer with the following mechanical properties is obtained:

Tensile strength (DIN 53504) _____kg./cm.² __ 333
Breaking elongation (DIN 53504) _____percent__ 645
Permanent elongation (1 minute after tearing) _____percent__ 7
Intrinsic strength _____kp__ 38
Shore Hardness A (DIN 53505) _____ 87
Elasticity (DIN 53512) _____percent__ 30

EXAMPLE 12

The procedure is as described in Example 10, except that about 36.9 parts of the diamine according to Example 6 are used. The resulting polyurethane shows the following mechanical properties:

Tensile strength (DIN 53504) _____kg./cm.$^2$__ 322
Breaking elongation (DIN 53504) _____percent___ 683
Permanent elongation (1 minute after tearing) _____percent___ 6
Intrinsic strength _____kp__ 70
Shore hardness 9 (DIN 53505) _____ 88
Elasticity (DIN 53512) _____percent__ 27

EXAMPLE 13

The procedure is as described in Example 10 except that about 31.3 parts of the diamine according to Example 7 fused with about 20 parts of a polyester of adipic acid and ethylene glycol (OH number 56), are used. The resulting polyurethane shows the following mechanical properties:

Tensile strength (DIN 53504) _____kg./cm.$^2$__ 254
Breaking elongation (DIN 53504) _____percent___ 715
Permanent elongation (1 minute after tearing) _____percent___ 15
Intrinsic strength _____kp__ 40
Shore hardness A (DIN 53505) _____ 80
Elasticity (DIN 53512) _____percent__ 28

EXAMPLE 14

The procedure is as described in Example 10, except that about 36.9 parts of the diamine according to Example 9 are used. A polyurethane with the following mechanical properties is obtained:

Tensile strength (DIN 53504) _____kg./cm.$^2$__ 204
Breaking elongation (DIN 53504) _____percent___ 655
Permanent elongation (1 minute after tearing) _____percent___ 18
Intrinsic strength _____kp__ 36
Shore hardness A (DIN 53505) _____ 85
Elasticity (DIN 53512) _____percent__ 29

EXAMPLE 15

The procedure is as described in Example 10, except that about 20.1 parts of the diamine according to Example 2 are used. An elastomeric polyurethane with the following mechanical properties is obtained:

Tensile strength (DIN 53504) _____kg./cm.$^2$__ 274
Breaking elongation (DIN 54504) _____percent___ 572
Permanent elongation (1 minute after tearing) _____percent___ 13
Intrinsic strength _____kp__ 52
Shore hardness A (DIN 53505) _____ 92
Elasticity (DIN 53512) _____percent__ 34

EXAMPLE 16

About 200 parts of a polyester of adipic acid and ethylene glycol (OH number 56), about 33.2 parts of a mixture of 80% of 2,4- and 20% of 2,6-tolylene diisocyanate and about 13.7 parts of 4-methoxy-3,5-diaminobenzoic acid methyl ester according to Example 1, are reacted in accordance with the procedure described in Example 10 to give a polyurethane with the following mechanical properties:

Tensile strength (DIN 53504) _____kg./cm.$^2$__ 308
Breaking elongation (DIN 53504) _____percent___ 680
Permanent elongation (1 minute after tearing) _____percent __ 6
Intrinsic strength _____kp__ 66
Shore hardness A DIN (53505) _____ 85
Elasticity (DIN 53512) _____percent__ 40

EXAMPLE 17

About 200 parts of a polyester of adipic acid and ethylene glycol (OH number 56), about 31.2 parts of a mixture of 80% of 2,4- and 20% of 2,6-tolylene diisocyanate and about 12 parts of 4-chloro-3,5-diaminobenzoic acid methyl ester are reacted in accordance with Example 10 to form a polyurethane with the following mechanical properties:

Tensile strength (DIN 53504) _____kg./cm.$^2$__ 324
Breaking elongation (DIN 53504) _____percent___ 657
Permanent elongation (1 minute after tearing) _____percent___ 7
Intrinsic strength _____kp__ 52
Shore hardness A (DIN 53504) _____ 83
Elasticity (DIN 53512) _____percent__ 40

EXAMPLE 18

About 200 parts of a polytetramethylene glycol (OH number 53.5), about 38.3 parts of a mixture of 80% of 2,4- and 20% of 2,6-tolylene diisocyanate and about 28.4 parts of the diamine according to Example 3 are reacted in accordance with Example 10 to form a polyurethane showing the following mechanical properties:

Tensile strength (DIN 53504) _____kg./cm.$^2$__ 170
Breaking elongation (DIN 53504) _____percent___ 442
Permanent elongation (1 minute after tearing) _____percent___ 6
Intrinsic strength _____kp__ 22
Shore hardness A (DIN 53505) _____ 82
Elasticity (DIN 53512) _____percent__ 51

EXAMPLE 19

Following the procedure described in Example 18, a polyurethane with the following mechanical properties is obtained with about 26.3 parts of the diamine according to Example 4:

Tensile strength (DIN 53504) _____kg./cm.$^2$__ 238
Breaking elongation (DIN 53504) _____percent___ 535
Permanent elongation (1 minute after tearing) _____percent__ 10
Intrinsic strength _____kp__ 33
Shore hardness A (DIN 53505) _____ 92
Elasticity (DIN 53512) _____percent__ 52

EXAMPLE 20

About 200 parts of a polytetramethylene glycol ether (OH number 56), about 32.6 parts of a mixture of 80% of 2,4- and 20% of 2,6-tolylene diisocyanate and about 16.3 parts of the diamine according to Example 2 are reacted in accordance with the procedure described in Example 18. The resulting polyurethane has the following mechanical properties:

Tensile strength (DIN 53504) _____kg./cm.$^2$__ 110
Breaking elongation (DIN 53504) _____percent___ 858
Permanent elongation (1 minute after tearing) _____percent__ 10
Intrinsic strength _____kp__ 37
Shore hardness A (DIN 53505) _____ 85
Elasticity _____percent__ 50

EXAMPLE 21

Following the procedure described in Example 18, a polyurethane showing the following mechanical properties is obtained with about 31.3 parts of the diamine according to Example 7:

Tensile strength (DIN 53504) _____kg./cm.$^2$__ 168
Breaking elongation (DIN 53504) _____percent___ 560
Permanent elongation (1 minute after tearing) _____percent__ 10
Intrinsic strength _____kp__ 37
Shore hardness A (DIN 53505) _____ 85
Elasticity (DIN 53512) _____percent__ 50

EXAMPLE 22

About 200 parts of a polytetramethylene glycol ether (OH number 53.5), about 29.8 parts of a mixture of 80% 2,4- and 20% 2,6-tolylene diisocyanate and about 11.8 parts of the diamine according to Example 1 are reacted in accordance with the procedure described in Example 10. The resulting polyurethane has the following mechanical properties:

Tensile strength (DIN 53504) _____kg./cm.² __ 108
Breaking elongation (DIN 53504) _____percent__ 495
Permant elongation (1 minute after tearing) percent__ 7
Intrinsic strength _____kp__ 21
Shore hardness A (DIN 53505) _____ 78
Elasticity (DIN 53512) _____percent__ 56

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

EXAMPLE 23

200 g. of 4-chloro-3,5-dinitrobenzoic acid ethyl ester, which can be obtained by nitrating p-chlorobenzoic acid at 80 to 100° C. and esterifying the resulting 4-chloro-3,5-dinitrobenzoic acid with ethanol are added dropwise in the form of a solution in 1 l. of toluylene to the boiling mixture of 500 g. of water, 500 g. of iron powder, 5 g. of glacial acetic acid and 500 ml. of toluene. After neutralisation with sodium bicarbonate there are obtained 136 g. (87% of the theoretical) (melting point 135° C.) of the analytically pure 4-chloro-3,5-diaminobenzoic acid ethylester (NH-number 524) after separating of the iron sludge by cooling the toluene solution.

In analogous manner there are obtained the following compounds:

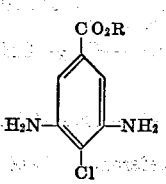

| Example | R | Melting point | NH-number Found | NH-number Calcd. |
|---|---|---|---|---|
| 24 | —C₃H₇ | 102 | 490 | 490 |
| 25 | —CH(CH₃)CH₃ | 107 | 490 | 490 |
| 26 | C₄H₉ | 94 | 463 | 461 |

TABLE—Continued

| Example | R | Melting point | NH-number Found | NH-number Calcd. |
|---|---|---|---|---|
| 27 | —CH₂—CH(CH₃)CH₃ | 91 | 462 | 461 |
| 28 | —CH(CH₃)C₂H₅ | 71 | 460 | 461 |
| 29 | —CH₂—CH₂—O—CH₃ | 113 | 456 | 459 |

Following the procedure described in Example 10 polyurethanes of the following properties are obtained with 0.1 mol of diamines according to Examples 23–29.

| Example | G. amine | Tensile strength [kg./cm.²] (DIN 53504) | Breaking elongation [percent] (DIN 53504) | Permanent elongation after tearing [percent] | Intrinsic strength [kp.] | Shore-hardness A/D (DIN 53504) | Elasticity [percent] (DIN 53512) |
|---|---|---|---|---|---|---|---|
| 30 | 21.5 g. acc. Example 23 | 319 | 627 | 16 | 55 | 92/38 | 36 |
| 31 | 22.8 g. acc. Example 24 | 341 | 602 | 12.5 | 46.5 | 93/41 | 34 |
| 32 | 22.8 g. acc. Example 25 | 365 | 607 | 11 | 73 | 93/42 | 35 |
| 33 | 24.3 g. acc. Example 26 | 322 | 613 | 17.5 | 61 | 93/38 | 34 |
| 34 | 24.3 g. acc. Example 27 | 355 | 637 | 16 | 63 | 90/40 | 33 |
| 35 | 24.3 g. acc. Example 28 | 342 | 602 | 14 | 59 | 93/39 | 35 |
| 36 | 24.45 g. acc. Example 29 | 355 | 585 | 9.5 | 51 | 92/40 | 34 |

EXAMPLE 37

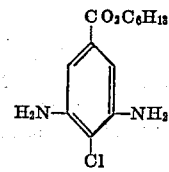

493 g. (2 mols) of 4-chloro-3,5-dinitrobenzoic acid are suspended in 500 ml. of benzene.

357 g. of thionylchloride are slowly added dropwise at 70 to 80° C. and the mixture is refluxed upon the addition of 10 g. of dimethylformamide until the evolution of hydrogen chloride ceases. The excess thionylchloride is distilled off and the residue esterified with 220 g. (2.2 mols) of hexanol-(1). When the evolution of hydrogen chloride has terminated the reaction product is recrystallized from 900 g. of methanol.

Yield: 603 g. (91.5%). Melting point: 51–52° C.

In a vessel of which is equipped with stirrer equipment 600 g. (1.81) mol) of 4-chloro-3,5-dinitrobenzoic acid hexylester, dissolved in 1 l. of toluene is added dropwise to a boiling mixture of 1200 g. of water, 1200 g. of iron powder, 12 of glacial acetic acid and 1 l. of toluene.

The reduction is completed after 4 hours. For neutralisation the reaction mixture is treated with 17 g. of sodium hydrogen carbonate and the water separated off in a separating funnel. After filtration and distilling of the toluene there are obtained 460 g. of a crystalline diamine. Pure 4-chloro-3,5-diaminobenzoic acid hexylester is obtained after recrystallisation from a mixture of 400 g. of benzene and 80 g. of cyclohexane.

Yield: 388 g. (83%). Melting point: 81–83° C. NH₂-number: 430.

In analogous manner the following diamines are obtained:

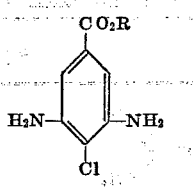

| Example | R | Melting point (° C.) | $NH_2$-number |
|---|---|---|---|
| 38 | —CH(CH$_3$)CH$_2$CH(CH$_3$)$_2$ | Oil | 403 (theoretical 414). |
| 39 | —CH$_2$—CH(C$_2$H$_5$)C$_4$H$_9$ | Oil | 379 (theoretical 375). |
| 40 | —C$_{18}$H$_{37}$ | 87 | 260 (theoretical 255). |
| 41 | —C$_6$H$_5$ | 142 | 430 (theoretical 427). |
| 42 | —CH$_2$—C$_6$H$_5$ | 107 | 410 (theoretical 460). |
| 43 | —C$_6$H$_{10}$—C(CH$_3$)$_3$ | 180 | 350 (theoretical 346). |
| 44 | —CH$_2$—CH$_2$—O—C$_4$H$_9$ | 58 | 395 (theoretical 391). |

Production of the polyurethane elastomers 200 g. of a polyester of adipic acid and ethylene glycol (OH-number 56) are dehydrated at 130° C. for 10 minutes in a water jet vacuum.

40 g. of a mixture consisting of 80% of 2,4-toluene-diisocyanate and 20% of 2,6-toluene-diisocyanate are added and the mixture is stirred for another 30 minutes. The melt is then cooled to 110° C. and degasified for 1 minute by the application of a vacuum.

0.1 mol of the amines according to the invention are added in liquid form. After an interval of 20 seconds the melt is poured into a preheated mould and the rapidly hardening moulding is heated at 100° C. for another 24 hours.

Mechanical properties:

| Example | G. diamine | Tensile strength [kg./cm.$^2$] (DIN 53504) | Breaking elongation [percent] | Permanent elongation after tearing [percent] | Intrinsic strength [kp.] | Shore-hardness A/D (DIN 53505) | Elasticity [percent] (DIN 53512) |
|---|---|---|---|---|---|---|---|
| 45 | 26.05 g. acc. Example 37 | 341 | 620 | 18 | 44 | 93/35 | 36 |
| 46 | 27.05 g. acc. Example 38 | 336 | 573 | 8 | 43 | 88/— | 35 |
| 47 | 29.85 g. acc. Example 39 | 356 | 620 | 18 | 43 | 91/34 | 34 |
| 48 | 43.85 g. acc. Example 40 | 277 | 600 | 35 | 32 | 92/39 | 37 |
| 49 | 28.65 g. acc. | 338 | 665 | 19 | 43 | 91/40 | 37 |

EXAMPLE 50

About 200 parts of a polyester of adipic acid and ethylene glycol (OH number 56), about 63.3 parts of 2,4-tolylene diisocyanate and about 57.5 parts of 4-chloro-3,5-diamino-benzoic acid isobutylester according to Example 27, are reacted in accordance with the procedure described in Example 10 to give a polyurethane with the following mechanical properties:

Tensile strength (DIN 53504) _____ kg./cm.$^2$ __ 321
Breaking elongation (DIN 53504) _____ percent __ 445
Permanent elongation (1 minute after tearing)
percent __ 35
Intrinsic strength _____ kp __ 43
Shore hardness D (DIN 53505) _____ 55
Elasticity (DIN 53512) _____ percent __ 40

What is claimed is:
1. A diamine having the formula

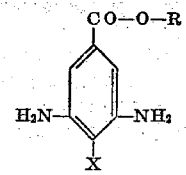

wherein R is an alkyl radical having from 1 to 20 carbon atoms which can contain oxygen atoms, a phenyl, benzyl or an unsubstituted cycloalkyl or lower alkyl substituted cycloalkyl radical and X is a halogen atom.

2. A diamine of claim 1 having the formula

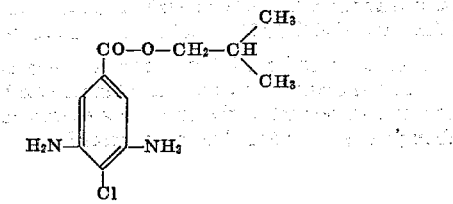

3. A diamine having the formula

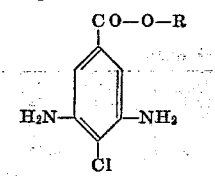

wherein R is selected from the group consisting of
—CH$_3$, —C$_2$H$_5$, n-, iso-C$_3$H$_7$, n-, iso-C$_4$H$_9$; C$_5$H$_{11}$, iso-C$_5$H$_{11}$, —C$_6$H$_{13}$,

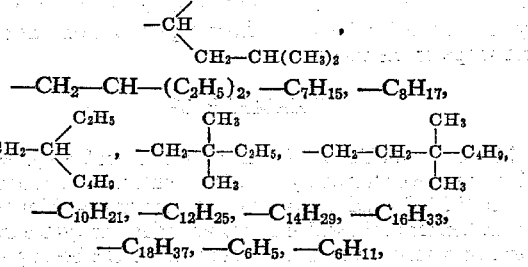

—CH$_2$—CH—(C$_2$H$_5$)$_2$, —C$_7$H$_{15}$, —C$_8$H$_{17}$,

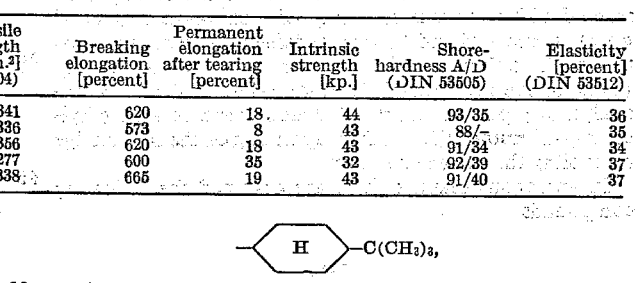

—C$_{10}$H$_{21}$, —C$_{12}$H$_{25}$, —C$_{14}$H$_{29}$, —C$_{16}$H$_{33}$,
—C$_{18}$H$_{37}$, —C$_6$H$_5$, —C$_6$H$_{11}$,
—C$_6$H$_{10}$—C(CH$_3$)$_3$,
—CH$_2$CH$_2$—O—C$_4$H$_9$, —CH$_2$—CH$_2$—O—CH(CH$_3$)$_2$
or
—CH$_2$—CH$_2$—O—CH$_2$—CH$_2$—O—C$_4$H$_9$.

References Cited
UNITED STATES PATENTS
3,095,399   6/1963   Müller et al. _____ 260—471 R
3,342,801   9/1967   Illy _____ 260—471 R LORRAINE A. WEINBERGER, Primary Examiner
L. A. THAXTON, Assistant Examiner U.S. Cl. X.R.
260—47 CZ, 77.5 AQ, 463, 472, 479 S

UNITED STATES PATENT OFFICE
CERTIFICATE OF CORRECTION

Patent No. 3,736,350           Dated   May 29, 1973

Inventor(s)   Walter Meckel and Erwin Muller

It is certified that error appears in the above-identified patent and that said Letters Patent are hereby corrected as shown below:

Column 2, line 47, "-$C_8H_{17}H$" should be --$C_8H_{17}$--.

It should be noted that the formula referred to at line 62, column 3, appears at line 1 of column 4; and the formulae bridging columns 3 and 4 after line 62 apply to that portion of the specification at column 4, lines 60-62.

Column 4, line 35, "of" should be --or--, same column, line 51, "halides" should be --dihalides--.

Column 5, 2nd line from bottom, first formula should read

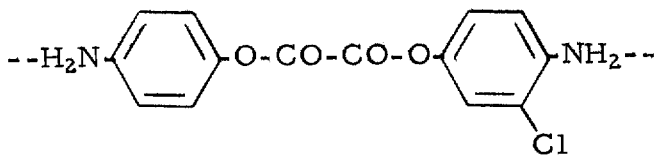

Column 8, line 37, formula should read

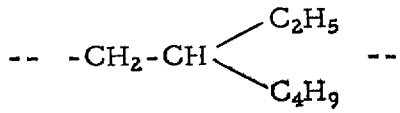

same column, lines 41 and 44, delete one occurrence of "-$C_{10}H_{21}$,"; same column, line 45, "-$CH_5$," should be -- -$C_6H_5$, --; same column, line 73, formula should read

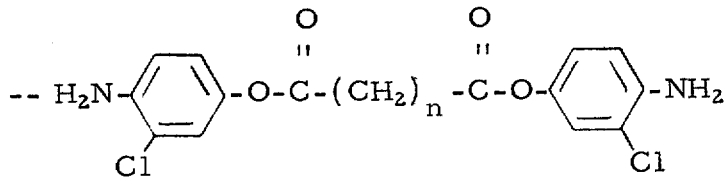

continued on page 2 ...

UNITED STATES PATENT OFFICE
CERTIFICATE OF CORRECTION

Patent No. 3,736,350          Dated  May 29, 1973

Inventor(s)  Walter Meckel and Erwin Muller          Page - 2

It is certified that error appears in the above-identified patent and that said Letters Patent are hereby corrected as shown below:

Column 10, lines 7 and 8, "hydroxy" should be --hydroxyl--; same column, line 11, "hydroxy" should be --hydroxyl--.

Column 13, line 30, after "160°" insert --C--.

Column 15, line 12, "Shore hardness 9" should be --Shore hardness A--; same column, line 52, "(DIN 54504)" should be --(DIN 53504)--.

In the table bridging columns 17 and 18, the heading Shore hardness A/D, "(DIN 53504)" should be --(DIN 53505)--.

Column 19, line 15, formula for Example 38 should read

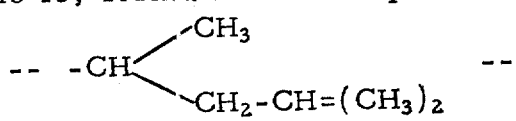

Signed and sealed this 20th day of November 1973.

(SEAL)
Attest:

EDWARD M. FLETCHER, JR.          RENE D. TEGTMEYER
Attesting Officer                Acting Commissioner of Patents